(12) United States Patent
Morris et al.

(10) Patent No.: US 8,687,802 B2
(45) Date of Patent: Apr. 1, 2014

(54) METHOD AND SYSTEM FOR ACCELERATING THE DETERMINISTIC ENCIPHERING OF DATA IN A SMALL DOMAIN

(75) Inventors: Benjamin J. Morris, Davis, CA (US); Phillip Rogaway, Davis, CA (US); Till Stegers, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 539 days.

(21) Appl. No.: 12/750,528

(22) Filed: Mar. 30, 2010

(65) Prior Publication Data

US 2010/0246813 A1 Sep. 30, 2010

Related U.S. Application Data

(60) Provisional application No. 61/164,660, filed on Mar. 30, 2009.

(51) Int. Cl.
*H04L 9/00* (2006.01)
*H04L 9/28* (2006.01)
*H04K 1/00* (2006.01)
*H04K 1/04* (2006.01)
*H04K 1/06* (2006.01)

(52) U.S. Cl.
USPC ............... 380/28; 380/29; 380/37; 380/46; 713/189

(58) Field of Classification Search
None
See application file for complete search history.

(56) References Cited

U.S. PATENT DOCUMENTS

| | | | |
|---|---|---|---|
| 7,418,100 B2* | 8/2008 | McGrew et al. | 380/37 |
| 2001/0038693 A1* | 11/2001 | Luyster | 380/37 |
| 2002/0118830 A1* | 8/2002 | Watanabe et al. | 380/46 |
| 2003/0053627 A1* | 3/2003 | Iizuka | 380/46 |
| 2004/0247116 A1* | 12/2004 | Boren et al. | 380/37 |
| 2005/0149739 A1* | 7/2005 | Hopkins et al. | 713/184 |
| 2007/0106908 A1* | 5/2007 | Miyazaki et al. | 713/189 |
| 2007/0140482 A1* | 6/2007 | Ploog et al. | 380/44 |
| 2008/0292100 A1* | 11/2008 | Komano et al. | 380/29 |
| 2009/0296928 A1* | 12/2009 | Matsumoto et al. | 380/46 |
| 2010/0086126 A1* | 4/2010 | Yokota et al. | 380/28 |
| 2011/0085663 A1* | 4/2011 | Rozek et al. | 380/255 |
| 2011/0211691 A1* | 9/2011 | Minematsu | 380/46 |

OTHER PUBLICATIONS

Morris, Ben et al., "How to Encipher Messages on a Small Domain Deterministic Encryption and the Thorp Shuffle", Appears in Advances in Cryptology—CRYPTO 2009.
"Advanced Encryption Standard", Downloaded from http://en.wikipedia.org/wiki/Advanced_Encryption_standard, on Sep. 15, 2009, pp. 1-8.
Morris, Ben et al., "Thorp Mode Encryption Specification Version 0.1", pp. 15-19.

* cited by examiner

*Primary Examiner* — Shin-Hon Chen
(74) *Attorney, Agent, or Firm* — Park, Vaughan, Fleming & Dowler LLP

(57) ABSTRACT

Conventional block ciphers that traffic in 128-bit block sizes are ill-suited for operating in small domains like credit card numbers. Some embodiments relate to techniques for constructing and speeding up practical and provably secure schemes for deterministically enciphering data from a small domain like credit card numbers using a conventional block cipher or other pseudorandom function.

22 Claims, 10 Drawing Sheets

Database of U.S. Social Security Numbers

Computing $E_{KT}$(348882346) = 888234606

9-character register MainReg[0..9]

Round 0

$\mathcal{F}_K$ ← 0 (round)

$\mathcal{F}_K$(0, 48882346) = 7

Addition mod-10

$3 +_{10} 7 = 0$

Round 1

$\mathcal{F}_K$ ← 1 (round)

$\mathcal{F}_K$(1, 88823460) = 2

Addition mod-10

METHOD AND SYSTEM FOR ACCELERATING THE DETERMINISTIC ENCIPHERING OF DATA IN A SMALL DOMAIN

RELATED APPLICATION

This application hereby claims priority under 35 U.S.C.§119 to U.S. Provisional Application 61/164,660 entitled "Thorp Mode Encryption," by Benjamin J. Morris, Philip Rogaway, Terence Spies, and Till Stegers, filed Mar. 30, 2009, which is herein incorporated by reference.

BACKGROUND

1. Field

The present embodiments relate to cryptographic techniques for constructing a blockcipher-based encryption scheme. More specifically, the present embodiments relate to techniques for constructing fast and provably secure schemes for deterministically enciphering data from a small domain, like credit card numbers, using a conventional block cipher.

2. Related Art

Imagine wanting to encrypt a nine-decimal-digit plaintext, such as a U.S. Social Security number, into a ciphertext that is also a nine-decimal-digit number. This operation is useful for storing the ciphertext in the same record structure as the plaintext. Modern cryptographic techniques typically assume the plaintext input to a block cipher has a block size of 128 bits and that the block cipher outputs a ciphertext of 128 bits. Unfortunately, nine-decimal-digit plaintext input and nine-decimal-digit ciphertext output are incompatible with a block size of 128 bits.

One could imagine attempting to construct the desired scheme directly, by modifying a known primitive, but such constructions have many shortcomings. For example, one could modify the definition of the Advanced Encryption Standard (AES) so that it would take in a nine-decimal-digit plaintext and output a ciphertext that is also a nine-decimal-digit number. But both the specification and implementations of AES have been carefully crafted, and the specification has been in the public domain for a considerable time, so a modified version of AES would need careful study by many cryptographers to determine whether the level of security believed to be provided by AES was compromised. As such, it is neither feasible nor desirable to employ such an approach.

In an alternative approach, rather than modifying AES, one could embed the nine-decimal-digit plaintext one wants to encrypt into a 128-bit string, and then invoke AES. Because AES returns a 128-bit string, the output would have to be mapped back into a nine-decimal-digit number. But it is impossible to encode a 128-bit string into nine decimal digits, since $2^{128} > 10^9$.

Is it really a problem if one cannot encrypt nine-decimal-digit numbers into nine-decimal-digit numbers? Consider a database of U.S. Social Security numbers. Suppose one wished to silently replace all of the Social Security numbers with encrypted Social Security numbers. Using AES to produce an output of 128 bits and using this in place of the nine-decimal-digit numbers would break existing applications that access and manipulate U.S. Social Security numbers, because such applications, expecting nine-decimal-digit strings, are now faced with 128-bit binary strings instead. Further, the database schema for each table containing U.S. Social Security numbers would need to be changed to support a different data type, and dependent applications would need to be modified accordingly. Conventional block ciphers like AES are, therefore, not directly usable to encrypt on small domains of practical interest, because these techniques send 128-bit inputs to 128-bit outputs.

Hence, what is needed is a cryptographic technique to encipher elements from a small domain into elements of the same small domain.

SUMMARY

The present embodiments provide a practical system for enciphering input data drawn from a small domain into output data that is also drawn from the same domain. The system can be based on a conventional block cipher. Further, the system's process of enciphering can be sped up significantly to reduce the number of invocations of a conventional block cipher that are needed. Finally, the system is practical and can enjoy provable security guarantees.

In some embodiments, the small domain that can be enciphered is the set of credit card numbers or the set of U.S. Social Security numbers. In general, the domain can be the set of all strings of some fixed length n, where each string consists of base-k characters for some $k \geq 2$.

In some embodiments, the system's process of enciphering elements from a small domain can be likened to shuffling cards. Each step in the enciphering process is analogous to shuffling a deck of cards. Each card represents a message with the domain of the cipher.

In some embodiments, the system's process of enciphering can be sped up by five times compared to a more naïve embodiment.

In some embodiments, the system's process of enciphering can be sped up by two times compared to a more naïve embodiment.

In some embodiments, a conventional block cipher like AES (the Advanced Encryption Standard) is used to implement a pseudorandom function that generates pseudorandom bits and is used internally within the embodiment.

In some embodiments, the obliviousness property of a card shuffle—the property of a shuffle that you can trace the trajectory of a card without attending to the trajectories of other cards—is the basis of the encryption scheme that is subject to the speed-up technique.

BRIEF DESCRIPTION OF THE FIGURES

Table 1 illustrates the Thorp shuffle technique with the obliviousness property in which only card seven is shuffled through four rounds in accordance with an embodiment.

Table 2 illustrates how the enciphering system concatenates bits from the input string to index into a speed-up register to obtain a random bit in accordance with an embodiment.

Table 3 illustrates some example parameter sets in accordance with an embodiment.

In the figures, like reference numerals refer to the same figure elements. Moreover, multiple instances of the same type of part may be designated by a common prefix separated from an instance number by a dash.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for deterministically enciphering plaintext in a small domain such as U.S. Social Security numbers or credit card numbers into a ciphertext in the same domain. More generally, embodiments provide a method and system for deterministically enciphering plaintext in a small domain consisting of all strings of identical length over some finite alphabet.

Figure 1:
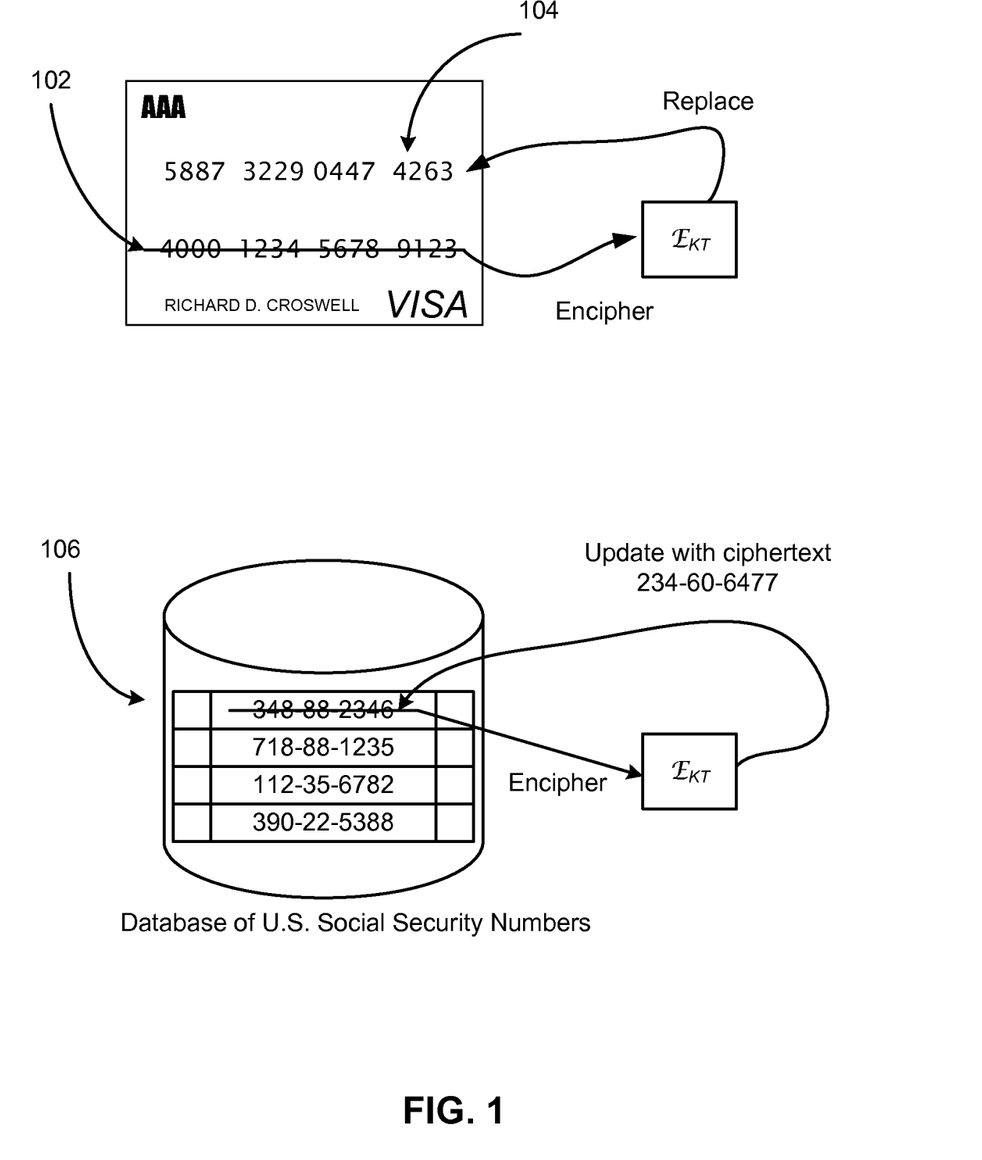
FIG. 1 shows two examples of domains for small-space encryption in accordance with an embodiment.

FIG. 1 shows two examples of systems that operate in small domains in accordance with some embodiments. The first system enciphers a 16-decimal-digit credit card number 102, the plaintext, into a ciphertext 104 that is also a 16-decimal-digit number. The second system is an example of a database of Social Security numbers 106 stored in a table of the database. In this example, the system enciphers each nine-decimal-digit U.S. Social Security number into a ciphertext that is also a nine-decimal-digit number, which looks just like another Social Security number. The ciphertext result is stored in place of the original Social Security number, updating the corresponding field in the database table. It is also possible to decipher each such Social Security number ciphertext to recover the original upon retrieval from the database. Another example of a small domain (not shown) is pieces of credit card numbers in which, say, the last five digits are shown in the clear and the first 11 digits are encrypted in accordance with an embodiment. These examples are not meant to limit the scope of the present invention but serve to illustrate their possible domains of use.

The examples given are a special case of "format-preserving encryption" (FPE). In an FPE scheme, encryption is deterministic and the format of the ciphertext is identical to that of the plaintext. The advantage of FPE is that it simplifies adding encryption to systems with legacy data like the database because field types for the legacy data need not be changed when the data is enciphered.

In the systems illustrated in FIG. 1 we show a box labeled $E_{KT}$, the enciphering system, which takes an input string such as a credit card number or a U.S. Social Security number and returns its respective enciphered output. More specifically, we define a cipher, a map $\mathcal{E} : \mathcal{K} \times \mathcal{T} \times \mathcal{M} \to \mathcal{M}$ where $\mathcal{K}$, $\mathcal{T}$ and $\mathcal{M}$ are finite non-empty sets and where $\mathcal{E}$ is a permutation on $\mathcal{M}$ for every $K \in \mathcal{K}$ and $T \in \mathcal{T}$. The set $\mathcal{K}$ is the key space, the set $\mathcal{T}$ the tweak space, and the set $\mathcal{M}$ is the domain. The shared key K controls the encryption. Both the key space and the domain are sets of strings drawn from an arbitrary alphabet (a finite, non-empty set of characters). The elements of set $\mathcal{M}$ are called plaintexts, or messages, and the number of them is denoted by $|\mathcal{M}|$=N.

The tweak space is a set of arbitrary byte strings. The set $\mathcal{T}$ should be large enough to accommodate all non-secret information that may be associated with a plaintext. Users are strongly encouraged to employ tweaks whenever possible, as their judicious use can significantly increase security. The intuition behind using a tweak in an FPE scheme is that we want knowledge of where a plaintext maps to under a tweak T does no good in trying to figure out where the same or even all plaintexts maps to under a different tweak T'.

The cipher $\mathcal{E}$ should have following properties: (1) given a key and a tweak, it is bijective, that is, it is a one-to-one and onto function; (2) it is deterministic—it does not depend on any internal randomness or "coins;" (3) it is practical—meaning that it is simple and fast to compute; and (4) it is provably secure—meaning that a proof is known that provides a significant assurance that it is a good pseudorandom permutation. In saying that $\mathcal{E}$ is a good pseudorandom permutation we mean that a black box for computing $\mathcal{E}$ with respect to a random key $K \in \mathcal{K}$ looks to an adversary with reasonable computational means like a family of independent random permutations on $\mathcal{M}$ indexed by tweaks in the tweak space.

In one or more embodiments, if the domain $\mathcal{M}$ is the space of U.S. Social Security numbers, then $\mathcal{M} = \{0, 1, \ldots, N-1\}$, and $N=10^9$. FIG. 1 shows encrypting a Social Security number in terms of the cipher via $\mathcal{E}$, K, T, 348-88-2346)=234-60-6477 (where hyphens are retained to show that the ciphertext is a U.S. Social Security number). In one or more embodiments, if the domain $\mathcal{M}$ is the space of 16-digit credit card numbers, then $\mathcal{M} = \{0, 1, \ldots, N-1\}$, where $N=10^{16}$. Further, FIG. 1 shows encrypting a credit card number in terms of the cipher via E(K, T, 4000 1234 5678 9123)=5887 3229 0447 4263.

Figure 2:
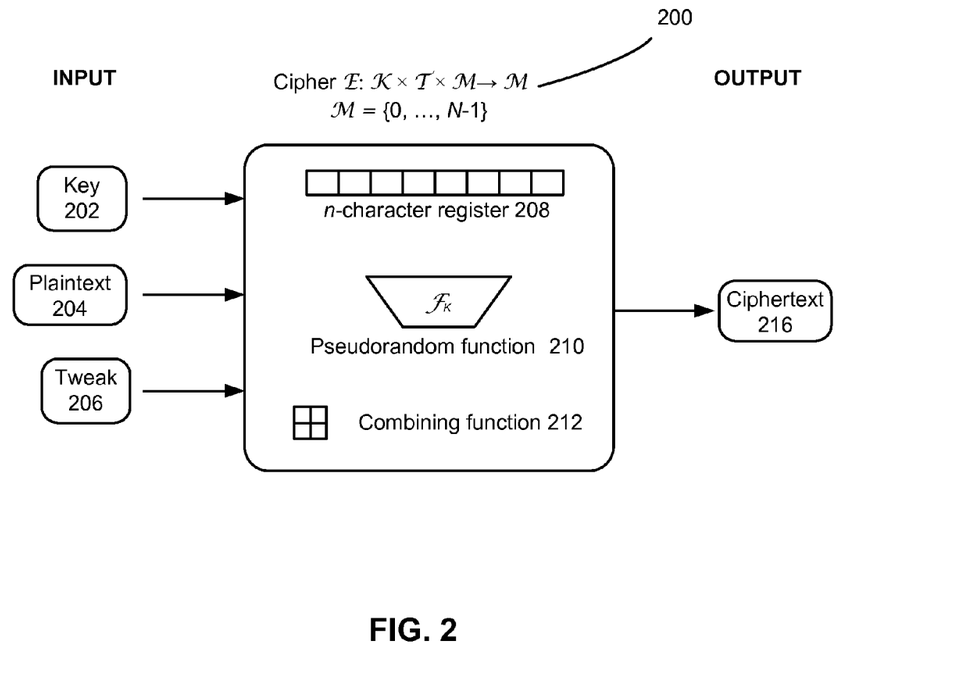
FIG. 2 shows the major components of an implementation of a cipher E in accordance with an embodiment.

FIG. 2 shows the major components of an implementation of a cipher $\mathcal{E}$ in one embodiment of the present invention. The components implement a tweaked pseudorandom permutation on $\mathcal{M}$ for every key in $\mathcal{K}$ and every tweak in $\mathcal{T}$. The cipher $\mathcal{E}$ mechanism receives three arguments as inputs, namely a "Key" 202, a "Plaintext" 204, such as a credit card number or a U.S. Social Security number, and a "Tweak" 206. The "Plaintext" 204 is stored in an n-character register 208. "Key" 202 is an element of the set of keys $\mathcal{K}$, which may be defined as a set of 128-bit strings, where $\mathcal{K}$ is the set of keys of the pseudorandom function. "Tweak" 206 is an element of the set of tweaks $\mathcal{T}$, which contains strings of bytes drawn from the set BYTE$^{\leq j}$ where $J=2^{64}1$ and BYTE denotes $\{0,1\}^8$, the set of 8-bit bytes. Note that characters are the most general format because they include bits, decimal digits, and hexadecimal digits, to name a few. The pseudorandom function 210 is the key to making the cipher practical and realizable; the function takes a round number, the key "Key" 202, and the tweak "Tweak" 206 and outputs a fixed-length pseudorandom base-k character string. In one embodiment, this pseudorandom function 210 can be constructed from the CBC-MAC of AES (Advanced Encryption Standard). In yet another variation, the pseudorandom function 210 can be implemented using CMAC. In another variation, the key K itself can be a 128-bit quantity, a 192-bit or even a 256-bit quantity, depending on the level of security desired.

The "combining function" 212 takes a pair of equal length strings and returns a string of the same length. In one embodiment, when messages are bit strings, the combining function may be modulo-2 addition, also known as exclusive-or. In another embodiment, when messages are decimal strings, the combining function is modulo-10 addition. In the general embodiment, the combining function 212 may be modulo-k addition for base-k characters. The output of the cipher $\mathcal{E}$ 200 as a result of performing the computation 212 is "Ciphertext" 216, which is in the same domain as the input "Plaintext" 204.

What is the reason for including a tweak in the cipher $\mathcal{E}$? Suppose we are enciphering the six middle digits of a 16-digit credit card number; the remaining ten digits are to be left in the clear. If we use a deterministic and tweakless scheme, there is a danger that an adversary might be able to create, by noncryptographic means, an unnecessarily useful dictionary of plaintext/ciphertext pairs (X, Y), where X is a 6-digit number and Y is its encryption. Each plaintext/ciphertext pair (X, Y) that the adversary somehow obtains (acquired, for example, by a phishing attack) would let the adversary decrypt every credit card number that happens to have those same six middle digits. Note that in a database of 100 million entries we would expect about 100 credit card numbers to share any given six middle digits. Learning k credit card numbers and possessing an encrypted database ought not give you 100° k. more credit card numbers for free.

The problem is not a cryptographic failure, but a failure to use a good tool well. The middle-six digits ought to have been tweaked by the remaining ten. If this had been done then learning the credit card number 1234-123456-9876 encrypts to 1234-770611-9876, say, would not let one decrypt 1111-770611-9999, as the mapping of 123456 to 770611 is specific to the surrounding digits 1234/9876.

In general, it is desirable to use all information that is available and statically associated to a plaintext as a tweak for that plaintext. In the most felicitous setting of all, the non-secret tweak associated to a plaintext is associated only to that plaintext. Extensive tweaking means that fewer plaintexts are enciphered under any given tweak. This corresponds, in the pseudorandom function model we have adopted, to fewer queries to the target instance. The relevant metric is the maximum number of plaintexts enciphered with the same tweak, which is likely to be significantly less than the total number of plaintexts enciphered.

To implement the cipher $\mathcal{E}$, we need a representation of a message (the plaintext) and a procedure to "mix" the key K with the message. To be deterministic, practical and provably secure, the cipher $\mathcal{E}$ can be based on the idea of shuffling a deck of cards. Shuffling is equivalent to generating a random permutation of the cards. There are two basic algorithms for doing this. The first is simply to assign a random number to each card, and then to sort the cards in order of their random numbers. This will generate a random permutation, unless two of the random numbers generated are the same. This can be eliminated either by retrying these cases, or reduced to an arbitrarily low probability by choosing a sufficiently wide range of random number choices. The second, generally known as the Knuth shuffle or Fisher-Yates shuffle, is a linear-time algorithm, which involves moving through the pack from top to bottom, swapping each card in turn with another card from a random position in the part of the pack that has not yet been passed through (including itself). Providing that the random numbers are unbiased, this will always generate a random permutation.

A variation on these algorithms is the Thorp shuffle, where the deck is cut into two equal-sized piles. Intuitively, cipher $\mathcal{E}$ encrypts by "shuffling" a set of messages using Thorp's method, where these messages can be thought of as cards in a large deck. Consider such a deck of N cards where N is even. We wish to shuffle all the cards in the deck. First, cut the deck into two equal piles. Second, according to the outcome of a fair coin flip, drop the bottom card from either the left or right pile, and then drop the card from the bottom of the other pile. Continue in this way, flipping a total of N/2 independent coins, using each to decide if cards are dropped left-then-right or right-then-left, until there are no more cards. This is one round of the shuffle in which all cards from the two decks have been shuffled back into a single deck. Cut the deck again into two equal-sized piles and repeat the shuffle procedure for as many rounds as needed to mix the cards sufficiently.

To see the Thorp shuffle in action, imagine that the single deck of cards has been cut into two decks: one deck is labeled "deck 1" (left pile) and the second deck is labeled "deck 2" (right pile). In this unusual deck there are only eight cards, each labeled with a number 0, 1, 2, 3, 4, 5, 6, and 7. Consider the Thorp shuffle with 4 rounds on this deck of cards. Cards 0-3 are in deck 1, and cards 4-7 are in deck 2.

Consider the pair of cards 0 and 4 at the bottom of each deck. To shuffle the deck, how do we decide in which order to drop the bottom cards? Do we drop card 0 and then card 4? Or, do we drop card 4 first and then card 0? Flipping a fair coin makes this determination: for example, "heads" (coin flip=0) means drop left-then-right and "tails" (coin flip=1) means drop right-then-left. For card pair (0, 4) we flip a coin; it comes up "heads," so we drop card 0, and then drop card 4. The new deck being formed has card 0 at the bottom with card 4 on top of it. For each pair of remaining cards (1,5), (2,6) and (3,7), we flip a coin. Let us assume that "tails" is associated with (1,5), "tails" with (2,6) and "heads" with (3,7).

After performing the drop procedure for each pair of cards associated with each coin flip, the new deck is shown viewed from left to right instead of bottom to top: 0 4 5 1 6 2 3 7. After one round, the entire deck of eight cards has been shuffled using four independent coin flips. If we define a minimum, called a pass, as $\lceil \log_2 N \rceil$ then the total number of coin flips used in a pass is $\lceil \log_2 N \rceil \cdot N/2$. Here $\lceil \cdot \rceil$ computes the ceiling function such that $\lceil x \rceil$ is the smallest integer not less than x. The Thorp shuffle can mix the deck well after a small number of passes.

Whenever N cards are shuffled in this fashion, all the cards are being shuffled at the same time. Yet, it is possible to trace the route of any given card in the deck through each successive round of the shuffle without attending to the remaining cards in the deck. The Thorp shuffle is said to be oblivious to other cards in the deck in that one can focus on the route a single card takes as it is shuffled in multiple rounds; one need not be concerned with the route of other cards. An embodiment of the present invention leverages this obliviousness property of the Thorp shuffle: a sufficient number of rounds that mix the cards quickly enough makes encrypting over small domains practical and feasible.

To explain the obliviousness property of the Thorp shuffle, consider the same deck of eight cards in its original configuration: 0 1 2 3 4 5 6 7. Employing the obliviousness property, we can ignore seven of the cards and consider just shuffling card 7 in the deck. Alternatively, think of "encrypting" 7 by applying the Thorp shuffle and only looking at the route of 7 during the course of the shuffle. Table 1 shows the Thorp shuffle oblivious to all but card 7. Given the coin flips tails (1), heads (0), tails (1), and heads (0) for the pairs in which card 7 is involved, the four rounds of shuffling show that card 7 ends at position 4 (numbering the positions in the horizontal deck from 0 to 7). Thus, the result of encrypting 7 is 4 or $\mathcal{E}$ (K, T, 7)=4 for some K and T. The cards we do not care about are labeled with an asterisk "*" to focus our attention on 7. Note that 4 is drawn from the same domain as 7, namely $\mathcal{M} = \{0, \ldots, N-1\}$, where N=8.

TABLE 1

Thorp Shuffle (Compute E(K, T, 7) = 4)

| Round number | Card position 0 1 2 3 4 5 6 7 | Coin flips |
|---|---|---|
|  | * * * * * * * 7 |  |
| 1 | * * * * * * 7 * | Tails (1) right-then-left |
| 2 | * * * * * 7 * * | Heads (0) left-then-right |
| 3 | * * 7 * * * * * | Tails (1) right-then-left |
| 4 | * * * * 7 * * * | Heads (0) left-then-right |

The Thorp shuffle, due to its obliviousness, provides a practical method to encrypt messages over small domains. To implement the shuffle, and therefore the cipher $\mathcal{E}$, we need (1) a representation of the messages in space $\mathcal{M}$; and (2) a function that realizes uniform random coin flips.

First, we represent all messages in space $\mathcal{M}$, or the cards in the deck, by strings of the same length n over some fixed alphabet. In one embodiment, where $N=2^n$, messages are represented as a n-bit strings, so that for instance card 7 in the shuffle would be represented by the binary string 111. In general, if $N=k^n$, then each message in $\mathcal{M} = \{0, \ldots, k^n-1\}$ a string of n base-k digits.

Second, to implement the behavior of fair coin flips, we make use of a pseudorandom function family. The function (family) is said to be pseudorandom because it possesses the property that the input-output behavior of an instance of the family of such functions determined by a random key is computationally indistinguishable from a random function with the same signature. In an embodiment over an alphabet $\Sigma$ the signature of this pseudorandom function is $\mathcal{F} : \mathcal{K} \times \mathcal{T} \times \mathcal{N} \to \{0,1\}$, that is, given a key, a tweak, a round number, and a message, the function returns a pseudorandom bit of 0 or 1.

The key space $\mathcal{K}$ is identical to the key space of the cipher $\mathcal{E}$. For a key K, we use the notation $\mathcal{F}_K(\cdot)$ rather than $\mathcal{F}(K, \cdot)$ to indicate a pseudorandom function keyed with key K. The total number of random bits needed to shuffle a single card for R rounds is R bits, not (N/2)·R bits which would be needed to shuffle the entire deck. (The property of being able to follow the trajectory of a single card without attending to all the other cards is called obliviousness.) Table 1 shows R=4 rounds of the shuffle, and that four random bits are needed to implement the four coin flips. In a naive embodiment, the invocation of the pseudorandom function on each round returns a pseudorandom bit. The reason the round number is included as an argument to the pseudorandom function is to ensure that the pseudorandom bits are indeed generated independently for different rounds. The reason the tweak is included is ensure that the encryption processes for different tweaks, even for the same plaintext, are independent.

In one or more embodiments, the pseudorandom function $\mathcal{F}$ could be implemented using the CBC-MAC of AES, the Advanced Encryption Standard. The CBC-MAC is a well-known method for using the Cipher Block Chaining mode of operation to turn a block cipher into a Message Authentication Code (MAC). When implemented using the CBC-MAC, the function $\mathcal{F}$ must be constructed in such a way that the set of inputs on which the CBC-MAC is invoked is prefix-free, that is, for any distinct inputs x, y, x is not a prefix of y. This is because the CBC-MAC is known to be a good pseudorandom function when invoked on a set of prefix-free inputs, assuming that the underlying block cipher is a good pseudorandom random permutation. In addition to the CBC-MAC, the pseudorandom function could also be implemented using the CMAC mode of operation.

The pseudorandom function $\mathcal{F}$ typically needs to make only a single AES call per pseudorandom function invocation, provided the tweak has been preprocessed. Note that an AES call returns a 128-bit string. The pseudorandom function $\mathcal{F}$ will pick one of these 128 bits and return just one bit; in one embodiment function $\mathcal{F}$ returns bit 127. This is reasonable and practical because all 128 bits are guaranteed to be pseudorandom and, therefore, any bit chosen is pseudorandom.

Figure 3:
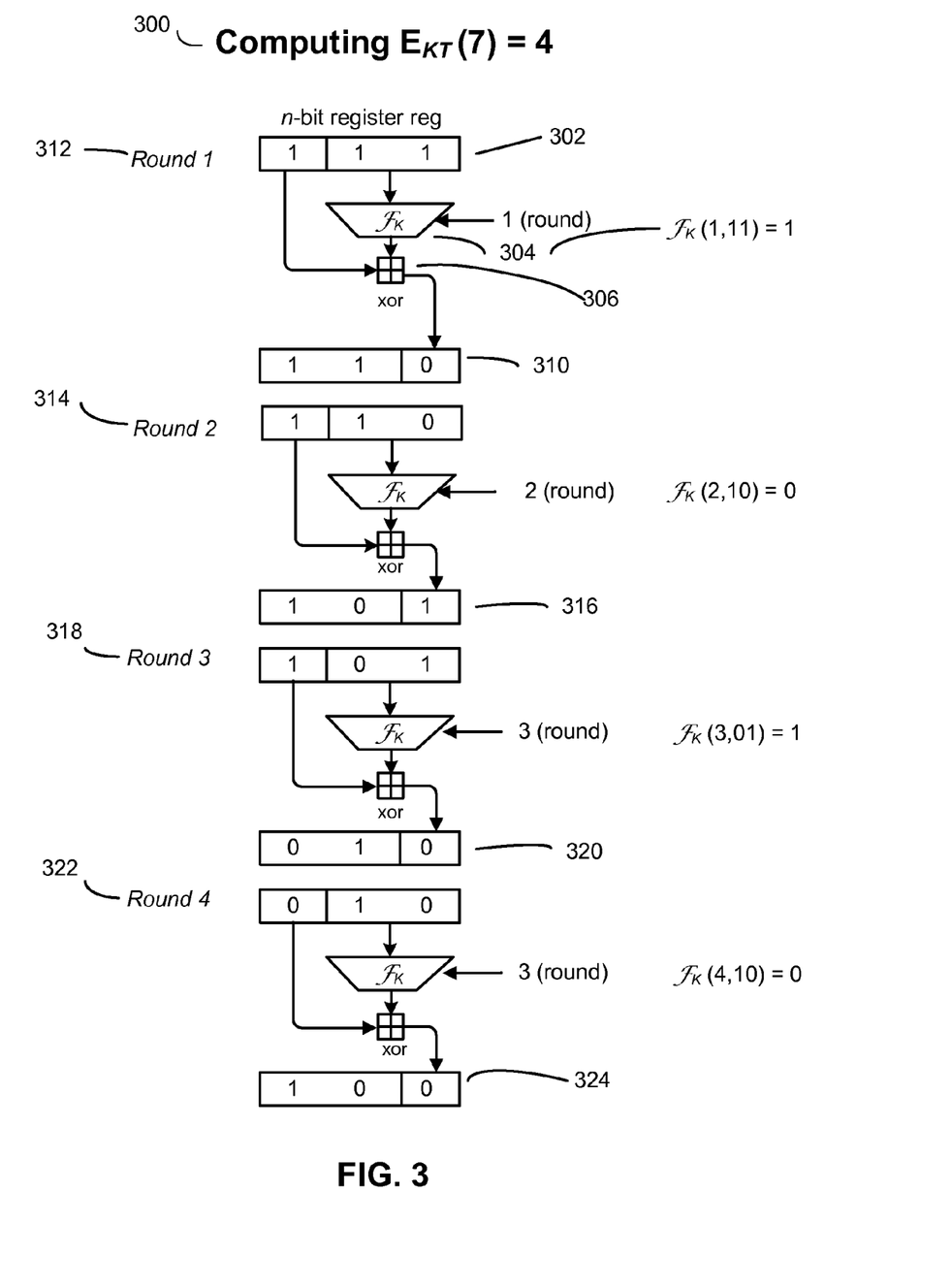
FIG. 3 shows a detailed example of how to encrypt a value drawn from the domain of playing cards numbered 0, . . . , 7 to another value in the same domain in accordance with an embodiment.

FIG. 3 illustrates a practical realization of the Thorp shuffle on a bit string of length n=3 in accordance with some embodiments. In this example illustrating an embodiment where $N=8=2^3$ and R=4, we trace the encryption of 7 (in binary, 111). We show that in this example the encryption yields $\mathcal{E}_{KT}(7)=4$ (300), just as we showed using cards. Note that the notation where "KT" is a subscript of cipher $\mathcal{E}$ indicates that the computation relies on the key K and the tweak T, which remain unchanged during the computation performed by $\mathcal{E}$. Suppose that bit string 111 is stored in an n-bit register called reg 302. The string is divided into two parts: reg[0] (the left side) and reg[1 . . . 2] (the right side).

In round 1 (312), the system invokes the pseudorandom function $\mathcal{F}_K$ 304 with the round number 1 and the value of reg[1 . . . 2]=11 as the arguments and outputs a pseudorandom bit $\mathcal{F}_K(r=1, x=11)=1$. The system computes the exclusive-or (which is one embodiment of the combining function 212 shown in FIG. 2) of this pseudorandom bit with the value of reg[0] and outputs the 1-bit value 1 xor 1=0. Then the system concatenates reg[1 . . . 2] (right side) with the value 0 output by the combining function 212, resulting in the string 11||0. This concatenated result is stored in reg. After one round, the new state is 110, or 6 in decimal, which can be seen in the new state of the n-bit register 310. Following the same procedure outlined above for each subsequent round, at the end of round 2 (314), the original plaintext 7 has been encrypted to the value 5 (316), after round 3 (318) to 2 (320), and, finally, after round 4 (322) to 4 (324), the value we expected and the same value returned in the Thorp shuffle of card 7.

For every round of the shuffle in this particular embodiment, the pseudorandom function $\mathcal{F}$ invokes the CBC-MAC of AES exactly once. This is because the CBC-MAC of the tweak can be cached, utilizing the fact that $CBC\text{-}MAC_K(0, X_1||X_2) = CBC\text{-}MAC_K(CBC\text{-}MAC_K(0, X_1), X_2)$, where $CBC\text{-}MAC_K(V, X)$ denotes the CBC-MAC of a sequence of blocks X starting with initialization vector V. With this preprocessing in mind, we refer to such a CBC-MAC invocation also as an AES call or AES invocation. Each CBC-MAC invocation returns an independent pseudorandom 128-bit string, ensuring that different rounds behave independently—but only 1 pseudorandom bit is returned by the pseudorandom function $\mathcal{F}_K$. Because the computation required for each AES call is potentially expensive, it seems especially wasteful that the above procedure only uses 1 bit for each round when 128 bits are available. In another embodiment of the present invention, these 128 bits from one AES call can be shared by multiple rounds. In particular, if $n \geq 5$ for $N=2^n$, then for each group of five rounds—called a phase—only one AES call is required. Each round uses a different non-overlapping 16-element subset of these same 128 bits to provide separation between different rounds. In particular, this embodiment of the optimization uses $5 \cdot 2^4 = 80$ bits of the 128 bits returned from the AES call. This is where the speed-up optimization comes into play—we avoid the expense of calling AES in each round and amortize its cost over five rounds, at the low price of some additional arithmetic and a small number of register lookups.

Figure 4A:
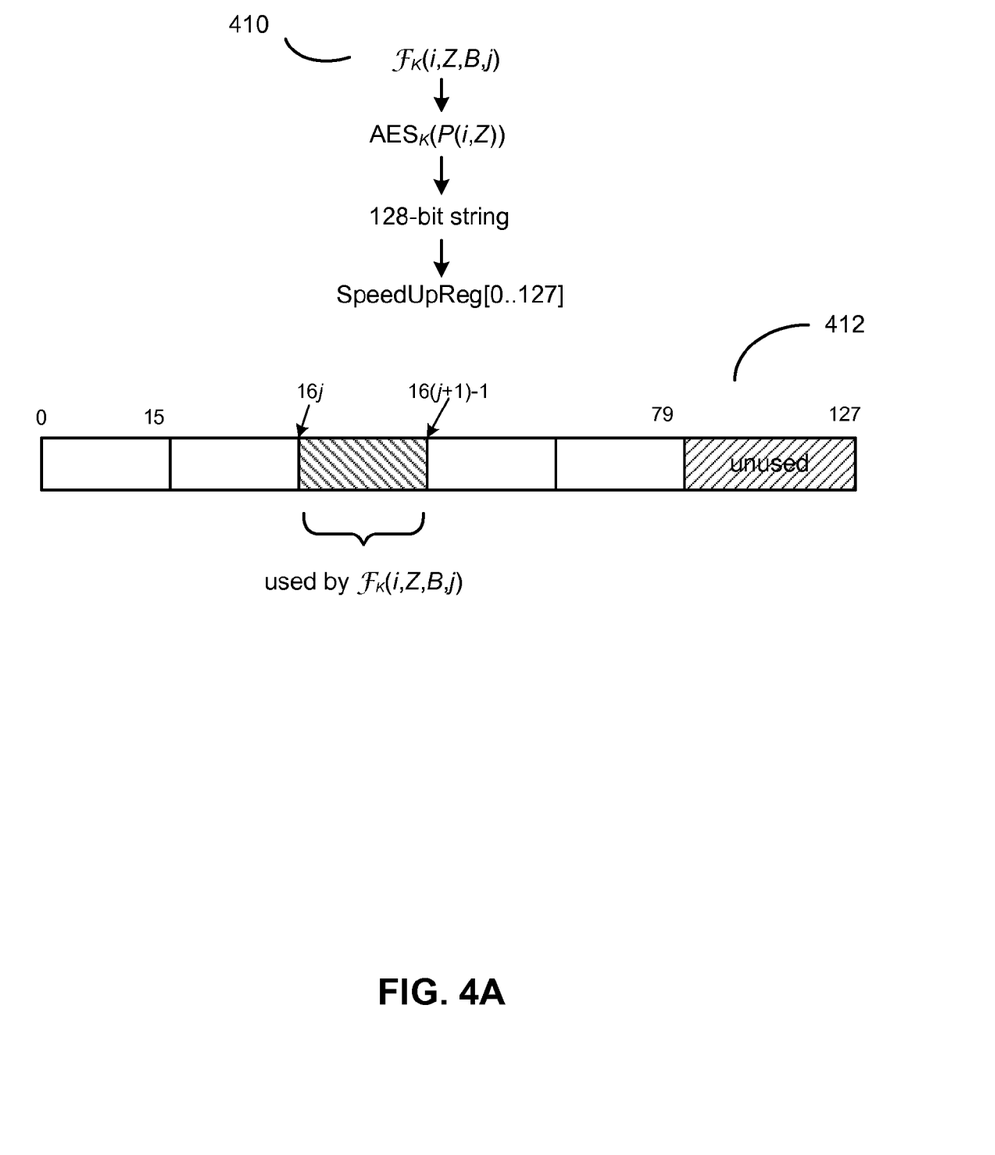
FIGS. 4A-4B show a detailed example illustrating the speed-up optimization to perform five rounds of enciphering using a single call to the underlying pseudorandom function in accordance with an embodiment.
Figure 4B:
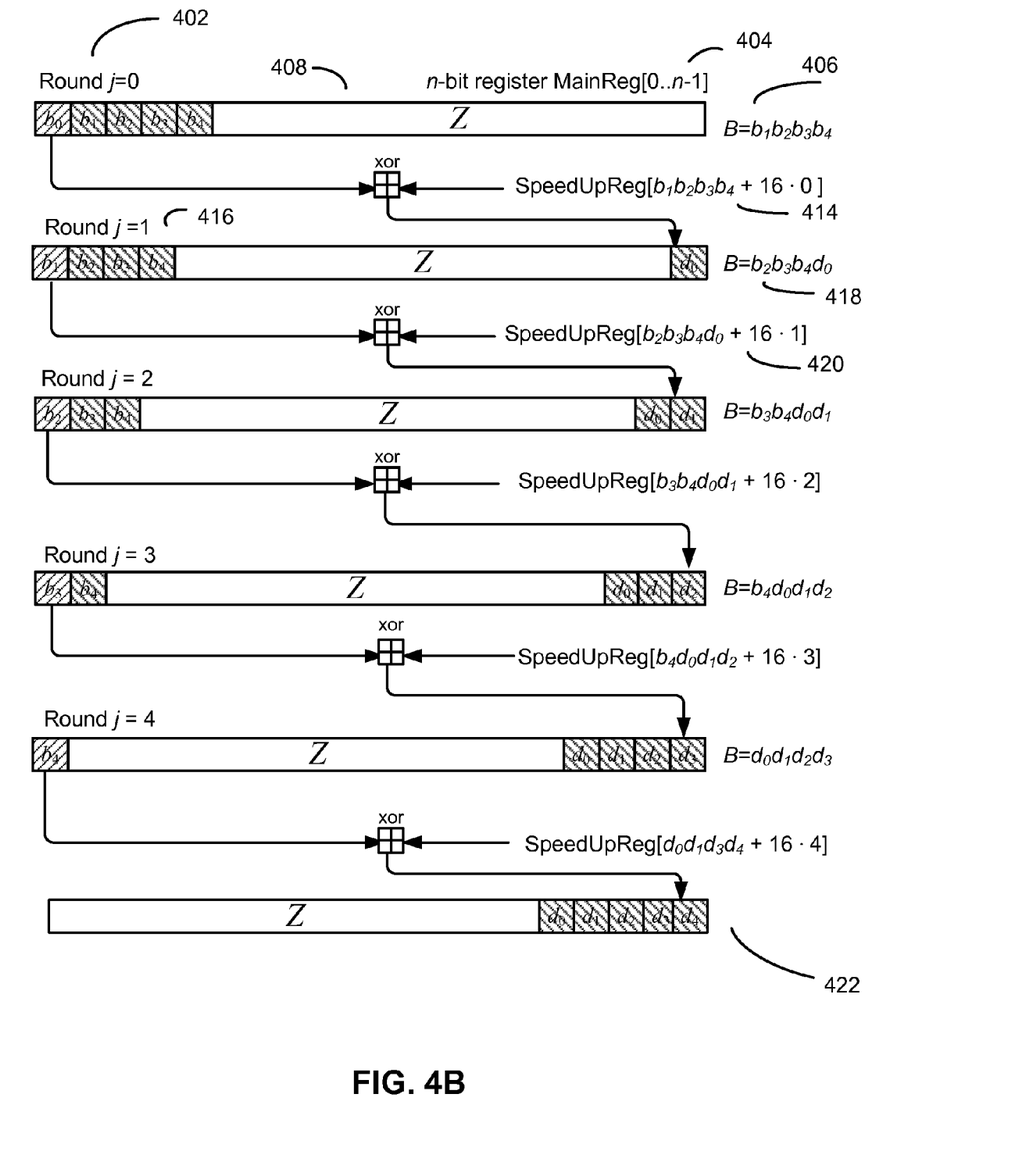

FIGS. 4A-4B show this speed-up optimization to encipher a message drawn from the set $\mathcal{M}$ where the total number of messages in $\mathcal{M}$ is $N=2^n$ for some $n \geq 5$ in accordance with some embodiments. The message to encipher is an n-bit string, stored in an n-bit register MainReg 404. In one round of the Thorp shuffle presented earlier only the bit in position [0] of MainReg was "active" in the sense that we computed the exclusive-or of that bit value with the output of the pseudorandom function $\mathcal{F}$. That same bit is still active under this speed-up optimization. What is different is that four other bits of the n-bit MainReg 404 are used to index into a speed-up register SpeedUpReg 412 (which we shall explain shortly) to yield a pseudorandom bit; this bit, as before, is exclusive-or-ed with the active bit. To populate this SpeedUpReg 412, one AES call (410) is made at the beginning of the 5-round. This AES call in one phase returns a random 128-bit string, which is then stored in SpeedUpReg 412. The five rounds making up a phase share the SpeedUpReg 412 to obtain their subsets of bits. The arguments to said AES call are the round number and the bits [5 . . . n] of the n-bit MainReg 404. Call this bit string Z 408. The optimization exploits the fact that the substring Z of MainReg is common to the n-bit strings in MainReg 404 in all five rounds of the phase. The call $AES_K(P(i, Z))$ is keyed with key K and takes as an argument, in one embodiment, a prefix-free encoding $P(i, Z)$ of the phase number i and the string Z.

The reason the speed-up optimization for enciphering n-bit strings performs five rounds and not six rounds is that each round examines a different 16-bit subset of the 128-bits in SpeedUpReg. Since 48 bits remain of the 128-bits considered in the SpeedUpReg, could we not also perform a sixth round and extract 16 of the 48 remaining bits to index into? The answer is no, unfortunately: Six rounds of enciphering per phase for n-bit strings to achieve a six-fold speed-up require that the pseudorandom function output at least $6 \cdot 2^{6-1}$ bits ($6 \cdot 2^5 = 192$), which is more than the 128 bits output by our pseudorandom function.

FIG. 4B shows the state changes of the n-bit register MainReg 404 for each round of a group of five rounds where index $j \in (0, 1, 2, 3, 4)$. We label the bits in MainReg[0], MainReg[1], MainReg[2], MainReg[3], and MainReg[4] at the beginning of round j=0 as $b_0, b_1, b_2, b_3$, and $b_4$ respectively.

For example, consider the round j=0 (402) of phase 5i. In MainReg 404, bit $b_0$ is the active bit. Bits $b_1, b_2, b_3$, and $b_4$ are concatenated to form a new bit string B 406 (shown to the right of the n-bit register as $b_1 b_2 b_3 b_4$). This bit string B 406 is used to index into SpeedUpReg[B+16·j]=SpeedUpReg[B] 414 to obtain one pseudorandom bit. Suppose this bit string is B=1010. When j=0, then SpeedUpReg[1010] indexes into position 10 decimal of the speed-up register. Suppose that the pseudorandom bit SpeedUpReg[1010] is 1. Note that B has four bits, so the index B+16·j always points to a position in the (j+1)-th 16-bit block of SpeedUpReg, ensuring that indices do not repeat across rounds.

Suppose that the pseudorandom bit SpeedUpReg[$1010_2$] is 1. Next, the system applies the combining function—in this embodiment, the exclusive-or operator—to the value (say) 1 in $b_0$=MainReg[0] and the pseudorandom bit SpeedUpReg [1010]=1 to produce a 1-bit output, the value $d_0$=0 (1 xor 1).

Next, the system concatenates the value in bit positions MainReg[1 . . . n—1] with the 1-bit output of the combining function, and stores the result in the register MainReg.

The new state of the register MainReg consists of bits $b_1, b_2, b_3$, and $b_4$ (so that $b_i$ occupies bit position [0]), followed by Z, and followed by $d_0$. In FIG. 4B, this state is shown in the next round.

To continue the example, consider the next round. Now j=1. The n-bit register MainReg 404 has the following state: $b_1 b_2 b_3 b_4 Z d_0$. Bit $b_1$ is the active bit. Bits $b_2, b_3, b_4$, and $d_0$ are concatenated to form a new bit-string B 418 (shown to the right of the n-bit register). Notice that bit $d_0$ is a result of the previous round and is appended to $b_2 b_3 b_4$ to form B=$b_2 b_3 b_4 d_0$=0100. This bit string B 418 is used to compute the index B+16·j=4+16=20 into the SpeedUpReg 420 to obtain the pseudorandom bit SpeedUpReg[20].

Next, the system applies the combining function to $b_1$=MainReg[0] and the pseudorandom bit looked up from SpeedUpReg 412 to produce a 1-bit output $d_1$.

Next, the system concatenates the value in bit positions MainReg[1 . . . n—1] with $d_1$ and stores the result in the register MainReg.

This procedure is continued for the next three rounds numbered j=2, j=3, and j=4. The very last state shown in the figure (422) is the final result of applying all five rounds in this phase to the n-bit register MainReg 404: $Z=d_0 d_1 d_2 d_3 d_4$. If there are more phases remaining in the shuffle, then the phase number is incremented by 1 and the next group of five rounds is computed. Note that there may be fewer than five rounds in the very last phase of the encryption process.

Figure 5:
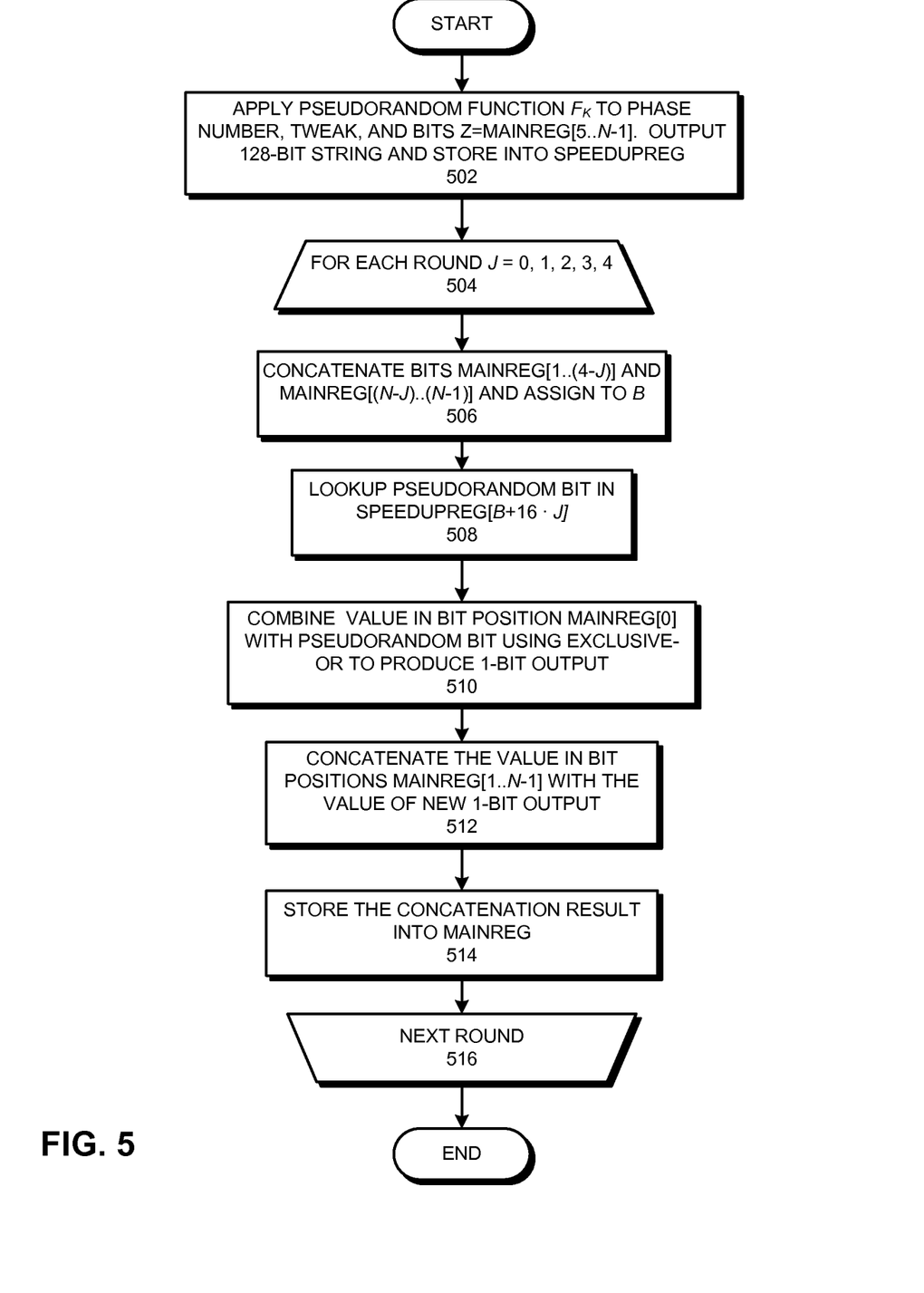
FIG. 5 shows a flowchart illustrating the process of performing five rounds of enciphering using a single call to the underlying pseudorandom function as a way of speeding up the process of enciphering for n-bit input strings in accordance with an embodiment.

FIG. 5 shows a flowchart illustrating the speed-up optimization of the Thorp shuffle in accordance with some embodiments. Note that the specific arrangement of steps shown in the figure should not be construed as limiting the scope of the embodiments. The enciphering system begins by invoking the pseudorandom function $\mathcal{F}_K$ (step 502), passing in the phase number i, tweak T, and the substring Z=MainReg[5 . . . n−1]. The underlying implementation of this function invokes $AES_K(P(i, Z))$, where P(i, Z) is a prefix-free encoding of the phase number and Z. The AES call outputs a 128-bit string. The system stores this string in the SpeedUpReg.

Next, the system starts an iteration (step 504) where each iteration is called a round and the round number j successively takes on the values 0, 1, 2, 3, 4.

Next, the system sets B to be the concatenation of bit strings MainReg[1 . . . (4-j)] and MainReg[(n−j) . . . (n−1)] (step 506). At first blush, it is not obvious what substrings are being concatenated, yet these correspond merely to the bit positions in MainReg that do not fall into Z. To see this, consider the following example, which borrows from FIG. 4. Column 1 of Table 2 is j, the round number. Column 2 lists the index range 1 . . . (4-j) for the respective values of j, which extracts the first substring. The reason for this choice of indices is clear: in FIG. 4 you can see that part of each round involves rotating the n-bit register by 1 bit and storing the result of the exclusive-or computation in position [n−1], so in each round Z is preceded by one bit $b_1$ less. Column 3 shows the bit strings extracted as reg[(n−j) . . . (n−1)]. From one round to the next, this bit string grows by 1 bit. Thus, at index j=0, [1 . . . 4] yields bit string $b_1b_2b_3b_4$, and [n . . . (n−1)] selects the empty string. At index j=1, [1 . . . 3] yields bit string $b_2b_3b_4$ and [(n−1) . . . [n−1] yields $d_0$. At index j=2, [1 . . . 2] yields bit string $b_3b_4$ and [(n−2) . . . (n−1)] yields $d_0d_1$. At index j=4, [1 . . . (4-j)] selects the empty string while [n . . . (n−1)] is $d_0d_1d_2d_3$.

TABLE 2

| | Bit concatenation for speed-up optimization | | |
|---|---|---|---|
| j | 1 . . . (4 − j) | (n − j) . . . (n − 1) | B |
| 0 | 1 . . . 4 | n . . . (n − 1) | $b_1b_2b_3b_4$ |
| 1 | 1 . . . 3 | (n − 1) . . . (n − 1) | $b_2b_3b_4d_0$ |
| 2 | 1 . . . 2 | (n − 2) . . . (n − 1) | $b_3b_4d_0d_1$ |
| 3 | 1 . . . 1 | (n − 3) . . . (n − 1) | $b_4d_0d_1d_2$ |
| 4 | 1 . . . 0 | (n − 4) . . . (n − 1) | $d_0d_1d_2d_3$ |

Next, the system consults the SpeedUpReg register (step 508) to look up the pseudorandom bit at index [B+16·j]. Note that B has four bits and thus corresponds to an index in $\{0, \ldots, 15\}$. To ensure that each distinct rounds select among disjoint 16-bit substrings of SpeedUpReg, we add an offset of 16·j to the integer value of B. Thus, round j=0 indexes into the range [0 . . . 15], round j=1 indexes into [16 . . . 31], and so on, until round j=4, which indexes into the range [64 . . . 79]. In other embodiments, the SpeedUpReg need only contain 80 bits from the output of the pseudorandom function, since only indices from 0 to 79 can occur. The system may store more than 80 bits (such as all 128) for efficiency or other reasons without affecting functionality.

Next, the system invokes the combining function that computes the exclusive-or (step 510) of the value in bit position [0] and the pseudorandom bit from step 508 and produces a new 1-bit output.

Next, the system concatenates the value in bit positions [1 . . . n−1] with the value of the new 1-bit output (step 512) to produce a new n-bit string.

Next, the system stores the concatenated result into MainReg (step 514).

If not all rounds of the current phase are complete, the system proceeds to the next round (step 516), continuing with step 504. Otherwise, the iteration ends.

FIGS. 4 and 5 illustrate the speed-up optimization for n-bit strings in accordance with some embodiments. As another, more realistic, example, consider FIG. 6, which shows how to encrypt a U.S. Social Security number such as 348-88-2346 using a practical realization of the Thorp shuffle in accordance with some embodiments. After two rounds of enciphering, the result is 888-23-4606. In this embodiment, only two rounds are shown but there can be as many rounds as needed to ensure that the Thorp shuffle mixes the "deck" of U.S. Social Security numbers well.

Figure 6:
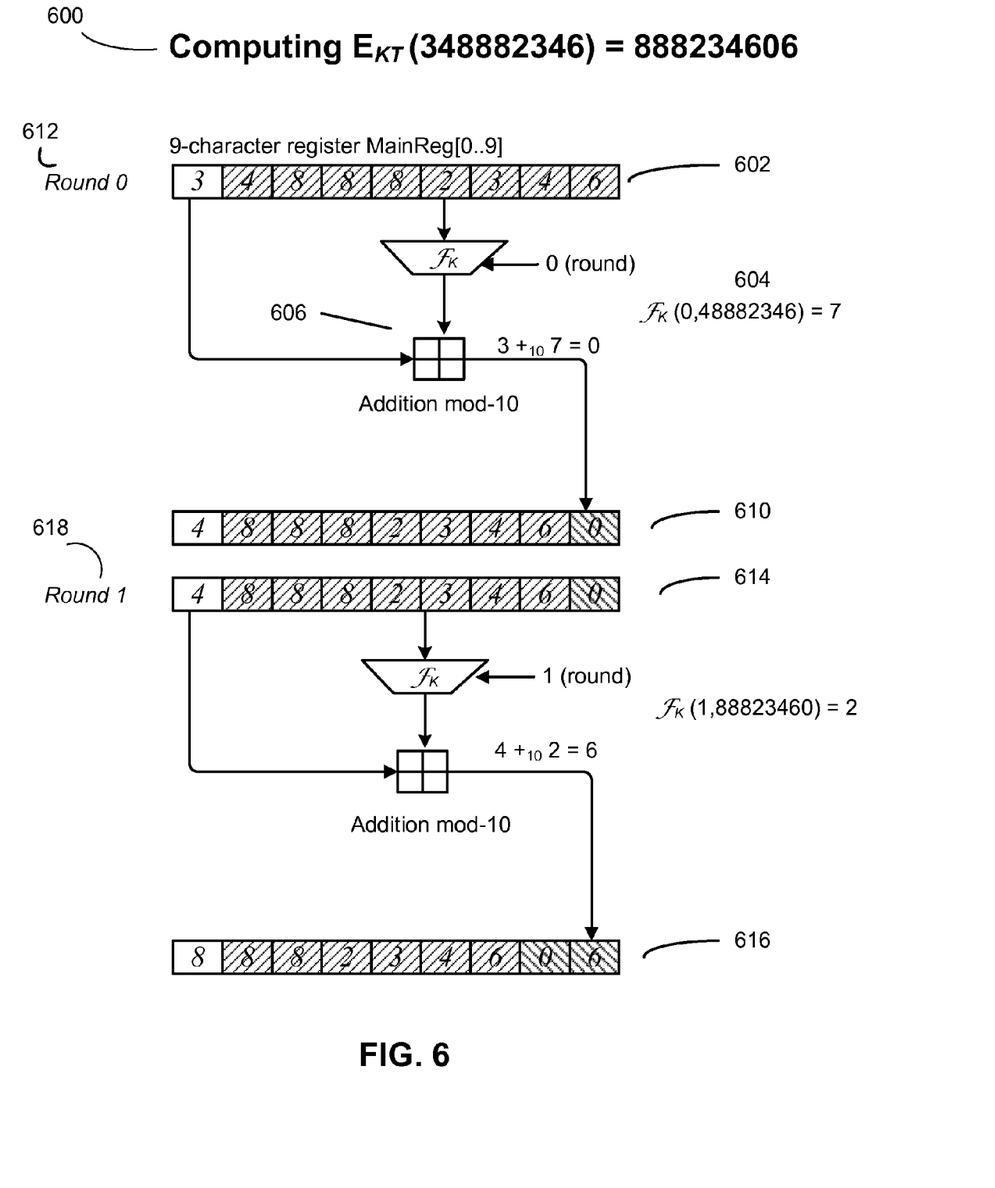
FIG. 6 illustrates the process of encrypting a U.S. Social Security number to another number in the same domain in accordance with an embodiment.

Let us look at this enciphering more closely. U.S. Social Security numbers are enciphered using a tweaked cipher $\mathcal{E}$: $\mathcal{K} \times \mathcal{T} \times \mathcal{M} \rightarrow \mathcal{M}$ where $\mathcal{K}$ is the key space of the underlying pseudorandom function, and $\mathcal{T}$ is a tweak space of byte strings, and $\mathcal{K}$ is the space of all U.S. Social Security numbers. The previous embodiment is modified to accommodate base-10 characters instead of binary characters as follows. First, the n-bit register is replaced with a nine-character register. Second, the exclusive-or binary operation (which is really modulo-2 addition) is replaced with modulo-10 addition. Third, the pseudorandom function $\mathcal{F}_K$ returns a base-10 character.

Suppose that a U.S. Social Security number 348882346 is stored in a register called MainReg 602. The character string is divided into two parts: MainReg[0] and MainReg[1 . . . 8]. In round 1 (612), the system invokes the pseudorandom function $\mathcal{F}_{KT}$ 604, passing in as arguments the round number 0 and the value of MainReg[1 . . . 8]=48882346. Suppose the invocation $\mathcal{F}_K(0, 48882346)$ 604 returns the character 7 (one may think of this as rolling a ten-sided die). We compute the modulo-10 (606) addition of this character with the value in character position [0] to get $3+_{10}7=0$. Next, we concatenate the value in MainReg[1 . . . n−1] (48882346) with the value of the output of the modulo-10 addition, 0, to produce a new character string, 488823460, and store it in register MainReg. After Round 1 (612), 348882346 has been encrypted to the intermediate value 488823460, as shown by the state of the 9-character register 610.

We follow the same procedure outlined above for each subsequent round. For example, assuming $\mathcal{F}_K(1, 888234606)=2$, round 1 (618) yields the intermediate encryption 888234606 of 348882346 (616). This example illustrates how the described enciphering scheme can be used to encrypt messages in a small domain such as U.S. Social Security numbers to ciphertexts in the same domain. Since $\mathcal{E}_{KT}$ is bijective, it is guaranteed two encrypted Social Security numbers only collide if their corresponding plaintexts are identical.

Figure 7:
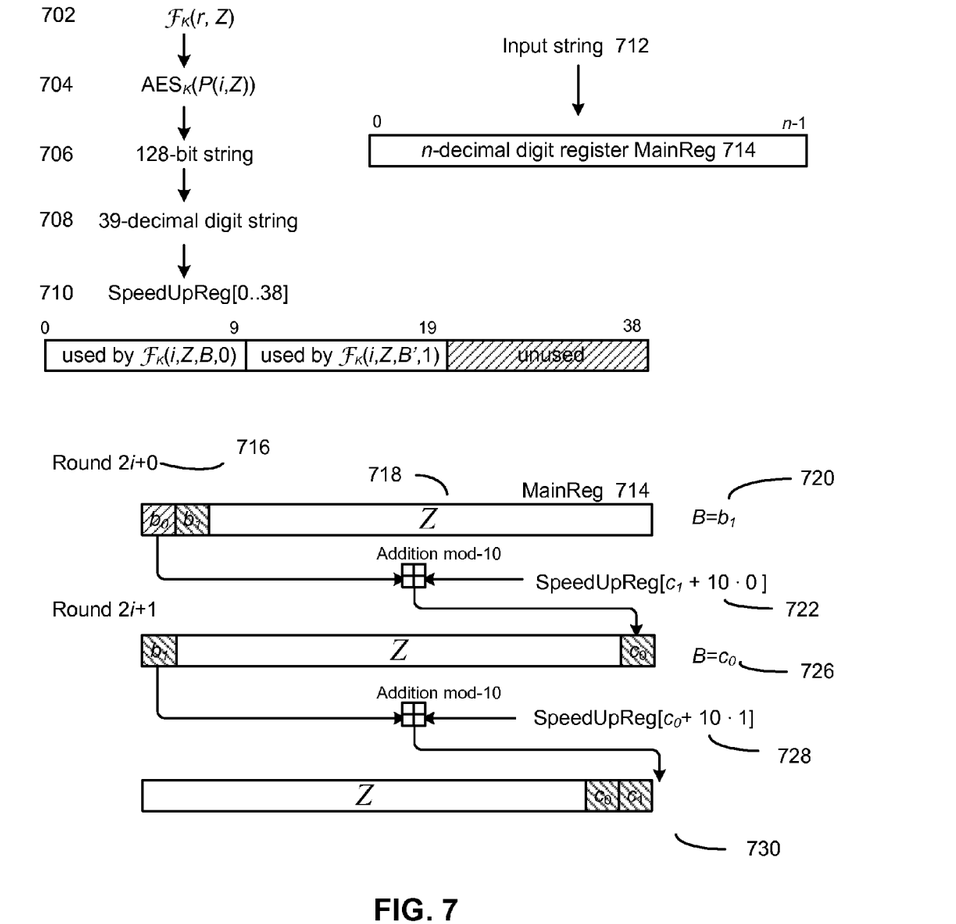
FIG. 7 shows a flowchart illustrating the process of performing two rounds of enciphering using a single call to the underlying pseudorandom function as a way-of speeding up the process of enciphering for n-decimal-digit input strings in accordance with an embodiment.

Note that the process of enciphering n-digit decimal strings can be sped up in a manner similar to that which was illustrated in FIG. 4 for n-bit input strings. Rather than achieving a fivefold speed-up in the n-bit string case (measured in the number of AES calls), an embodiment for decimal strings achieves a twofold speed-up. FIG. 7 illustrates the process for applying the speed-up optimization to n-decimal-digit strings in accordance with some embodiments. (Why phases comprise two rounds over the domain of decimal-digit strings and not five rounds as for bit strings will become clear in a moment.)

FIG. 7 shows this speed-up optimization to encipher a message drawn from set $\mathcal{M}$ where the total number of messages in set $\mathcal{M}$ is $N=10^n$ messages for some $n \geq 2$ in accordance with some embodiments. Each phase consists of two rounds. The message to encipher is an n-decimal-digit input string (712) stored in an n-decimal-digit register MainReg 714.

To populate this SpeedUpReg 710, one AES call (704) is made at the beginning of each phase as part of pseudorandom function $\mathcal{F}_K$ 702. This AES call (704) returns a pseudorandom 128-bit string. Since the SpeedUpReg stores decimal-digit strings, the system applies a conversion function that converts the 128-bit string to the corresponding 39-decimal-digit string, which is then stored in SpeedUpReg 710. The two rounds making up a phase share the SpeedUpReg 710 to obtain their subsets of bits. The decimal-digits MainReg[2 . . . n] of the n-decimal-digit MainReg 714 are a decimal string Z 718. The call $AES_K(P(i, Z))$ is keyed with key K and takes as an argument, in one embodiment, a prefix-free encoding P(i, Z) of the phase number i and the string Z. Similar to the binary case, the speed-up optimization exploits the fact that substring Z is common to the n-decimal-digit strings contained in MainReg 714 during both rounds of the current phase. In particular, in one embodiment, AES is keyed with K and applied to a prefix-free encoding P(i, Z) of the phase number i and the string Z.

In each phase of the encryption of decimal-digit strings using the speed-up optimization for enciphering decimal-digit strings, the two rounds examine disjoint 10-digit subsets of the 39-decimal digits in SpeedUpReg. Accordingly, 19 digits of the 39-decimal digits in SpeedUpReg remain unused. Could we not also perform a third round and extract 10 of the 19 remaining decimal digits to index into? Unfortunately, this does not work. Over the course of three consecutive rounds of enciphering, the three states of n-digit register MainReg contain only a common (n−3)-digit substring Z To assure independent pseudorandom characters, we would therefore need to index with a 3-digit string B. However, there are 100 possible values for B, so that the pseudorandom function would need to provide at least $3 \cdot 10^{3-1}$=300 digits, which is more than the 38 decimal digits obtained from the 128-bit string output we assume. In general, enciphering strings consisting of n base-k digits in phases comprising m rounds requires the pseudorandom function to output at least $m \cdot k^{m-1}$ base-k digits.

FIG. 7 shows the state changes of the n-decimal-digit register MainReg 714 for rounds j=0, 1 of some phase i. We label the contents of digit positions [0] as $b_0$ and [1] as $b_1$, shown cross-hatched in FIG. 7.

For example, consider the round 2i+j where j=0 (716). In MainReg 714, bit $b_0$ is the active bit, which we assume to be 5. Bit $b_1$ is extracted to form a new bit string B 720 (shown to the right of the n-decimal-digit register as B=$b_1$). This bit string B, say B=6, is used to index into the SpeedUpReg 710 to obtain the pseudorandom base-10 character SpeedUpReg[B+10·j]=SpeedUpReg[6]. Suppose that the pseudorandom decimal digit at that position is 9. Note that with this index formula, both rounds in the phase use 10 different decimal-digits of the 39 decimal digits in the SpeedUpReg 710.

Next, the system combines the value in decimal-digit position [0] with the pseudorandom decimal digit looked up from the SpeedUpReg 710 to produce a 1-decimal-digit output, which we denote by $c_0$. The combining function is simply modulo-10 addition, so $c_0 = 9 +_{10} 5 = 4$.

Next, the system concatenates the value in decimal-digit positions MainReg[1 . . . n−1] with $c_0$ and stores the concatenation result into the register MainReg 714.

The new state of the register MainReg 714 in round j=0 is $b_1 Z\, c_0$. To continue the example, consider the next round where j=1. The n-decimal-digit register MainReg 714 contains $b_1 Z c_0$. Digit $b_1$ is the active digit. Digit $c_0$ is extracted to form a new string B 726 (shown to the right of the n-decimal-digit register MainReg). This string B 726 is used to compute the index B+10·j=14 into SpeedUpReg 728 to obtain one pseudorandom decimal-digit from the next 10-digit subset of the speed-up register.

Next, the system combines the value in decimal-digit position [0] with the pseudorandom decimal-digit looked up from the SpeedUpReg 710 to produce a 1-decimal-digit output $c_1$. The combining function is again modulo-10 addition.

Next, the system concatenates the value in decimal-digit positions [1 . . . n−1] with the value of the 1-decimal-digit output of the combine function, and stores the concatenation result into the register MainReg.

The very last state shown in the figure is the end result of applying one two-round phase to the n-decimal-digit register 730: $Z c_0 c_1$. If there are more phases remaining in the shuffle then the phase number is incremented by 1 and the next group of two rounds is computed. (Note that there may be fewer than two rounds in the very last phase).

Figure 8:
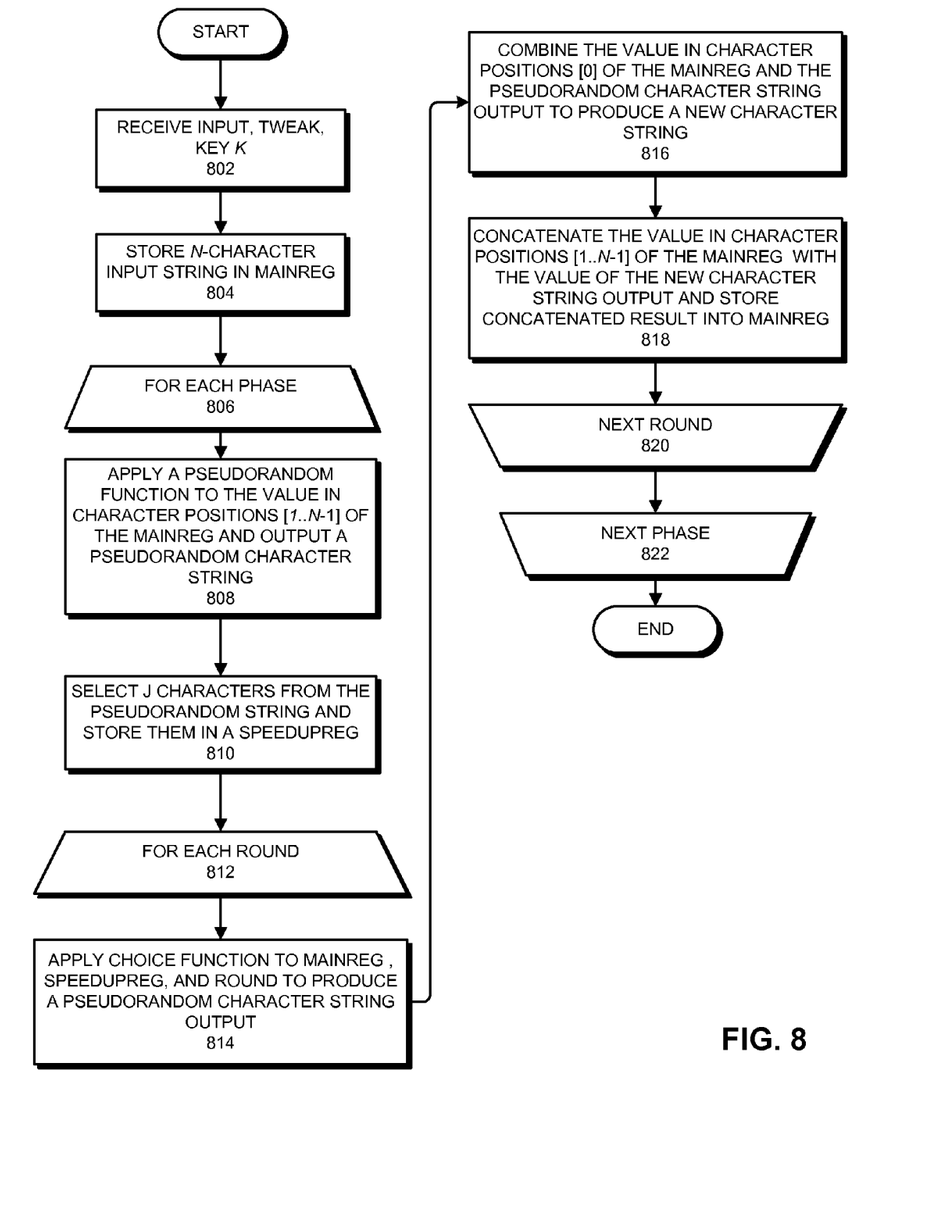
FIG. 8 illustrates the general process of encrypting a message in the format of an n-character input string where the character is base-k through p phases of enciphering in accordance with an embodiment.

FIG. 8 shows a flowchart illustrating a more general procedure of enciphering a message represented as an n-character string where each character is base-k digit in accordance with some embodiments. Note that the specific arrangement of steps shown in the figure should not be construed as limiting the scope of the embodiments. These embodiments include, but are not limited to, n-bit input strings, n-decimal-digit input strings, and n-hexadecimal-digit input strings.

The enciphering system begins the process by receiving (step 802) the message (a string of n base-k digits), the tweak (a byte string), and the key K. Each character is a base-k digit.

Next, the system stores the n-character input into an n-character first register MainReg (step 804).

Next, the enciphering system iterates over the first register MainReg in a numbered sequence of phases (step 806), modifying the state of MainReg. For each phase, the system performs the following.

Next, the system invokes the pseudorandom function $\mathcal{F}_K$ (step 808) with two arguments: the phase number i and the value MainReg[1 . . . n−1] together with the phase number p. $\mathcal{F}_K$ returns a pseudorandom base-k character string. Note that this pseudorandom function outputs a pseudorandom base-k character string of length l.

Next, the system selects at least $m \cdot k^{m-1}$ characters (step 810) for some m≥2 from the pseudorandom base-k character string output of the pseudorandom function $\mathcal{F}_K$ and stores these selected characters in a second register SpeedUpReg. The second register SpeedUpReg behaves as the same speed-up register shown in FIG. 4 and FIG. 7.

Next, the system iterates over the first register a sequence of m rounds (step 812). The last phase contains fewer rounds if the total number of rounds is not a multiple of m.

Next, the enciphering system applies a choice function (step 814) to the first register MainReg, the second register SpeedUpReg, and the round number to produce a pseudorandom base-k character output.

Next, the enciphering system combines the value in character position [0] of the first register and the pseudorandom base-k character output by the choice function to produce a new base-k character (step 816). Note that, in some embodiments, this combining function is modulo-k addition.

Next, the enciphering system (step 818) concatenates the value in character positions MainReg[1 . . . n−1] of the first register with the value of the new base-k character output and stores the result into the first register MainReg.

If there are more rounds (step 820), then the enciphering system goes to step 814 and continues with the process.

Otherwise, if there are more phases (822), then the enciphering system goes back to step 808 and continues the process with the next phase.

When all phases are complete, the input string has been successfully enciphered. The ciphertext is contained in the first register MainReg.

Figure 9:
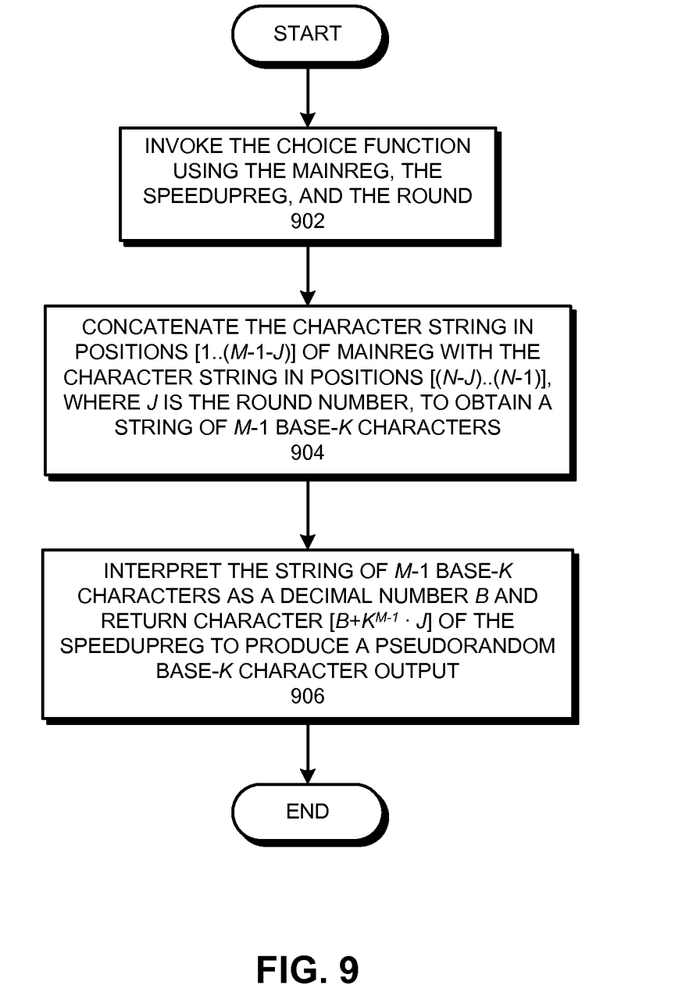
FIG. 9 illustrates the process of invoking a choice function on the input register and the speed-up register to return a pseudorandom character string in accordance with an embodiment.

FIG. 9 shows a flowchart elaborating the choice function given in step 814 of FIG. 8 in accordance with some embodiments. Note that the specific arrangement of steps shown in the figure should not be construed as limiting the scope of the embodiments. The enciphering system begins by invoking the choice function using the first register MainReg, the second register SpeedUpReg, and the round number as arguments to the function (step 902). What the system is doing, intuitively, is taking a pseudorandom character string—the output of the pseudorandom function stored conveniently in the SpeedUpReg—and "choosing" from a subset of the pseudorandom character string some character string that is, therefore, also pseudorandom.

Next, the enciphering system (step 904) extracts the (m−1) base-k characters string B from MainReg, where in round j, B is the concatenation of characters [1 . . . (m−1−j)] and characters [(n−j) . . . (n−1)] of MainReg.

Next, the enciphering system (step 906) interprets the string of m−1 base-k characters as a decimal number B and returns character $[b+k^{m-1} \cdot j]$ of the SpeedUpReg to produce a pseudorandom base-k character output.

The following table gives some valid values for k, m, l satisfying the parameter constraint $m \cdot k^{m-1} \leq l$.

TABLE 3

Example parameter sets

| Radix k | PRF output length l | Phase length m |
|---|---|---|
| 2 | 128 | 5 |
| 3 | 65 | 3 |
| 8 | 16 | 2 |
| 10 | 39 | 2 |
| 16 | 8 | 2 |

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A key-dependent method for reversibly enciphering an input string to an output string having the same length as the input string, comprising:
    receiving the input string;
    storing the input string into a register;
    modifying the register in a sequence of reversible and key-dependent phases, wherein each phase is functionally equivalent to two or more rounds of Thorp-shuffle encryption, and wherein each phase involves:
        invoking a pseudorandom function that outputs a pseudorandom string;
        iteratively modifying the register in a sequence of two or more rounds, wherein each round entails using a different portion of the pseudorandom string to direct the modification of the register; and
    providing the contents of the register as an output, after the sequence of phases completes.

2. The method of claim 1,
    wherein receiving the input string also involves receiving a key and a tweak; and
    wherein applying the pseudorandom function involves using the key and the tweak to determine the pseudorandom function.

3. The method of claim 1, wherein the pseudorandom function is implemented by the CBC-MAC of the Advanced Encryption Standard (AES).

4. A method for enciphering an input to produce an output, comprising:
    receiving the input, wherein the input is n characters in length and wherein each character is a base-k digit, for some $n \geq 2$ and $k \geq 2$;
    storing the input into an n-character first register;
    modifying the first register in a sequence of two or more numbered phases, wherein each phase involves:
        partitioning the first register into a first and second portion, the first portion comprising $m \geq 2$ characters and the second portion comprising the remaining n−m characters;
        applying a pseudorandom function to the phase number and the second portion, wherein the pseudorandom function outputs a pseudorandom character string t;
        obtaining from the pseudorandom string $m \cdot k^{m-1}$ base-k characters and storing them in a speed-up register;
        using the first portion of the first register to select characters from the speed-up register and combining the selected characters with the first portion of the first register to obtain a new right-hand side consisting m base-k characters;
        replacing the first register by the concatenation of the second portion of the first register and the new right-hand side; and
    providing the contents of the first register as an output, after the sequence of phases completes.

5. The method of claim 4, wherein concatenating two character strings involves:
    joining a first character string of x characters in length to a second character string of y characters in length to produce a new character string of x+y characters and wherein the new character string contains the characters of the first character string followed by the characters of the second character string.

6. The method of claim 4,
    wherein receiving the input involves receiving a key and a tweak; and
    wherein applying the pseudorandom function involves using the key and the tweak to determine the pseudorandom function.

7. The method of claim 4, wherein the pseudorandom function is constructed from the CBC-MAC of the Advanced Encryption Standard (AES).

8. The method of claim 7, wherein at least one AES call is performed per pseudorandom function invocation.

9. The method of claim 4,
    wherein said input is a Social Security number or a credit-card number or a Private Account Number; and
    enciphering the input into a string of the same length and drawn from the same character set simplifies adding encryption to a system with legacy data, because field types for the legacy data need not be changed when the data is enciphered.

10. A non-transitory computer-readable storage medium for storing instructions that when executed by a computer cause the computer to perform a method for enciphering an input to produce an output, comprising:

receiving the input, wherein the input is n characters in length and wherein each character is a base-k digit, for some n≥2 and k≥2;

storing the input into an n-character first register;

modifying the first register in a sequence of two or more numbered phases, wherein each phase involves:

partitioning the first register into a first and second portion, the first portion comprising m≥2 characters and the second portion comprising the remaining n−m characters;

applying a pseudorandom function to the phase number and the second portion, wherein the pseudorandom function outputs a pseudorandom character string;

obtaining from the pseudorandom string $m \cdot k^{m-1}$ base-k characters and storing them in a speed-up register;

using the first portion of the first register to select characters from the speed-up register and combining the selected characters with the first portion of the first register to obtain a new right-hand side consisting m base-k characters;

replacing the first register by the concatenation of the second portion of the first register and the new right-hand side; and providing the contents of the first register as an output, after the sequence of phases completes.

11. The non-transitory computer-readable storage medium of claim 10, wherein concatenating two character strings involves:

joining a first character string of x characters in length to a second character string of y characters in length to produce a new character string of length x+y number of characters and wherein the new character string contains the characters of the first character string followed by the characters of the second character string.

12. The non-transitory computer-readable storage medium of claim 10, wherein receiving the input involves receiving a key and a tweak; and     wherein applying the pseudorandom function involves using the key and the tweak to determine the pseudorandom function.

13. The non-transitory computer-readable storage medium of claim 10 wherein the pseudorandom function is constructed from the CBC-MAC of the Advanced Encryption Standard (AES).

14. The non-transitory computer-readable storage medium of claim 13, wherein at least one AES call is performed per pseudorandom function invocation.

15. The non-transitory computer-readable storage medium of claim 10, wherein said input is a Social Security number or a credit-card number or a Private Account Number; and     enciphering the input into a string of the same length and drawn from the same character set simplifies adding encryption to a system with legacy data, because field types for the legacy data need not be changed when the data is enciphered.

16. A system for enciphering an input to produce an output, comprising:

a receiving mechanism configured to receive the input, wherein the input is n characters in length and wherein each character is a base-k digit, for some n≥2 and k≥2;

a storing mechanism configured to store the input into an n-character first register;

a computation mechanism configured to modify the first register in a sequence of two or more numbered phases, wherein each phase involves:

partitioning the first register into a first and second portion, the first portion comprising m≥2 characters and the second portion comprising the remaining n−m characters;

applying a pseudorandom function to the phase number and the second portion, wherein the pseudorandom function outputs a pseudorandom character string;

obtaining from the pseudorandom string $m \cdot k^{m-1}$ base-k characters and storing them in a speed-up register;

using the first portion of the first register to select characters from the speed-up register and combining the selected characters with the first portion of the first register to obtain a new right-hand side consisting m base-k characters;

replacing the first register by the concatenation of the second portion of the first register and the new right-hand side; and     an outputting mechanism configured to provide the contents of the first register as an output, after the sequence of phases completes.

17. The system of claim 16, wherein concatenating two character strings involves:

joining a first character string of x characters in length to a second character string of y characters in length to produce a new character string of length x+y number of characters and wherein the new character string contains the characters of the first character string followed by the characters of the second character string.

18. The system of claim 16, wherein receiving the input involves receiving a key and a tweak; and     wherein applying the pseudorandom function involves using the key and the tweak to determine the pseudorandom function.

19. The system of claim 16 wherein the pseudorandom function is constructed from the CBC-MAC of the Advanced Encryption Standard (AES).

20. The system of claim 19, wherein at least one AES call is performed per pseudorandom function invocation.

21. The system of claim 16, wherein said input is a Social Security number or a credit-card number or a Private Account Number; and     enciphering the input into a string of the same length and drawn from the same character set simplifies adding encryption to a system with legacy data, because field types for the legacy data need not be changed when the data is enciphered.

22. A key-dependent method for reversibly enciphering an input string into an output string having the same length as the input string, the method comprising:

storing the input string in a register;

modifying contents of the register in a sequence of reversible and key-dependent phases, wherein each phase is functionally equivalent to two or more rounds of Thorp-shuffle encryption, and wherein said modification in each phase is directed by a multi-character output of a pseudorandom function; and     upon completion of said modification, providing the modified contents of the register as an output string.

\* \* \* \* \*